LOUDNESS TRANSMISSION TESTING SYSTEM

Filed Oct. 5, 1954 4 Sheets-Sheet 1

INVENTOR
N. R. STRYKER
BY Walter M. Hill
ATTORNEY

INVENTOR
N. R. STRYKER
BY Walter M. Hill
ATTORNEY

LOUDNESS TRANSMISSION TESTING SYSTEM

Filed Oct. 5, 1954 4 Sheets-Sheet 3

INVENTOR
N. R. STRYKER
BY
Walter M. Hill
ATTORNEY

INVENTOR
N. R. STRYKER
BY
Walter M. Hill
ATTORNEY

United States Patent Office 2,870,272

Patented Jan. 20, 1959

2,870,272

LOUDNESS TRANSMISSION TESTING SYSTEM

Norman R. Stryker, East Orange, N. J., assignor to Bell Telephone Laboratories, Incorporated, New York, N. Y., a corporation of New York Application October 5, 1954, Serial No. 460,379

8 Claims. (Cl. 179—175.1)

This invention relates to measurement of the acoustic performance of telephone equipment, and more particularly to a testing system and method of testing which permits direct measurement without use of human callers or listeners of the speech sound loudness transmission characteristics of telephone transmitters, receivers and circuits.

The naturalness of speech transmitted over telephone circuits employing present day transmitting and receiving equipment is sufficient to make any slight deviations in or alterations of the characteristics of such equipment of negligible importance in their effect on this speech factor. However, this is not the case as regards the loudness of transmitted speech, so that the loudness transmission characteristic is a factor of considerable importance in the design of improved telephone systems and components. Measurements of the loudness of transmitted speech have heretofore been difficult to make because of the fact that the loudness of a sound is a subjective phenomenon rather than a purely physical one, including as it does the psychological response of the person hearing it. While the intensity of a sound wave can be measured with appropriate instruments, the measured intensity must then be correlated with the experimentally determined average loudness corresponding to the intensity value of each sinusoidal component frequency in the complete frequency spectrum of the sound. The loudness calculation, therefore, requires measurement of the frequency spectrum of the sound, and application of involved computational techniques to determine the loudness value corresponding to the measured intensity value.

Testing arrangements presently in use for measuring the loudness transmission characteristic of a telephone device in comparison with a reference device frequently rely on actual calling and listening. Considering the testing of a telephone transmitter by this method, for example, a person serving as a "caller" speaks into a standard microphone which is connected into the telephone transmission circuit. Another person serving as a "listener" hears the speech as it is reproduced at his ear by a telephone receiver connected at the other end of the transmission circuit. The listener also has available for manipulation a manually adjustable attenuator connected into the receiving circuit, whereby he can control the volume of the transmitted speech signal prior to its conversion into sound by the telephone receiver. The caller then switches the transmitter to be tested into the telephone circuit in place of the standard microphone and calls the same speech sounds into it. The listener adjusts the attenuator until the loudness of the sound he then hears seems to him to be the same as the loudness of the sound he heard when the caller used the standard microphone. The change in the setting of the attenuator, which is usually calibrated in decibels, is a measure of the comparative loudness transmission efficiency of the transmitter under test with respect to the standard microphone. This test is a true measurement of loudness, but since the same sound often seems unequally loud to different listeners, the test must be repeated for a fair sampling of listeners and the results averaged to obtain a reliable indication. In addition, the test requires two distinct steps, first using a standard reference instrument, and then using the instrument to be tested. It is therefore apparent that the calling and listening procedure is both time-consuming and cumbersome to apply and interpret.

In an endeavor to eliminate the need for a listener, various special instruments have been devised. Up to the present time these have included much equipment of a non-linear type, with multiple selectable circuits each of which only simulates the loudness response of the ear over a narrow range of sound intensities which must be known in advance. A linear loudness indicating instrument, providing accurate loudness trasmission measurements over the range of frequencies involved in speech transmission over telephone circuits, is disclosed and claimed in my copending application entitled "Loudness Indicator," filed this same day, Serial No. 460,341, now Patent No. 2,808,475. However, that indicator must be specially constructed. Also, it does not eliminate the need for a caller. For laboratory development work it is preferable to have a complete testing system requiring neither callers nor listeners, and for the system to permit obtaining measurements truly indicative of the performance telephone devices under test would give in actual service.

In the article "A Proposed Loudness Efficiency Rating for Loudspeakers and the Determination of System Power Requirements for Enclosures," H. F. Hopkins and N. R. Stryker (the applicant), Proceedings of the I. R. E., volume 36, March, 1948, pages 315–335, a concept of loudness weighting is developed. For a complete description reference should be made to the article. Briefly, it describes a means whereby a signal having a flat intensity vs. frequency spectrum over a range of 300 to 3300 cycles per second can be weighted so that a measurement of the pressure of the sound output from a loudspeaker to which the weighted signal is applied will be proportional to the loudness of the sound output. However, in order to utilize such a weighted signal for testing telephone devices, it is necessary that the complete testing arrangement closely simulate actual telephone service conditions. Since a telephone transmitter is the first link in a telephone transmission system, the means and method of applying the weighted signal to the transmitter, and the means and method of conditioning the transmitter so its behavior in the testing system simulates its actual service performance, are of equal importance with the problem of producing the weighted signal.

An object of the invention is to provide a simplified method of and means for directly determining the speech sound loudness transmission characteristics of telephone equipment without use of human callers or listeners.

A further object is to accomplish the foregoing without a specially designed loudness measuring instrument.

A further object is to provide a telephone equipment speech sound loudness transmission testing system which will provide a measure of the loudness transmission characteristic of such equipment in terms of the response of a conventional intensity responsive measuring instrument rather than relative to the performance of an arbitrarily chosen comparison standard.

A further object is to provide a method of determining the speech sound loudness transmission characteristic of telephone equipment which will be accurately indicative of this characteristic of the equipment in actual telephone service.

The invention attains these objects by applying to a modified loudspeaker a speech sound loudness weighted signal voltage comprising all frequencies in the spectrum of speech normally transmitted by telephone systems. The weighting is such that the percent of total intensity below any frequency in the signal is the same as the percent of total loudness below the same frequency in speech sound.

The modified loudspeaker is acoustically coupled to a telephone transmitter in a manner simulating the coupling between the mouth of a caller and a telephone transmitter in actual telephone service. The telephone transmitter is conditioned by a novel procedure comprising a particular agitating method and utilization of the loudness weighted signal so that the transmitter response closely simulates its response in actual telephone service. The output of the transmitter constitutes a speech sound loudness testing signal. This signal may be applied to a complete telephone transmission system, and is such that the response of an intensity responsive indicator connected at any point in the system will be proportional to the loudness of the signal at that point. The difference in the response at different points is proportional to the loudness transmission loss between those points.

The invention may be completely understood from a reading of the following detailed specification in conjunction with the accompanying drawings in which.

Figure 1:
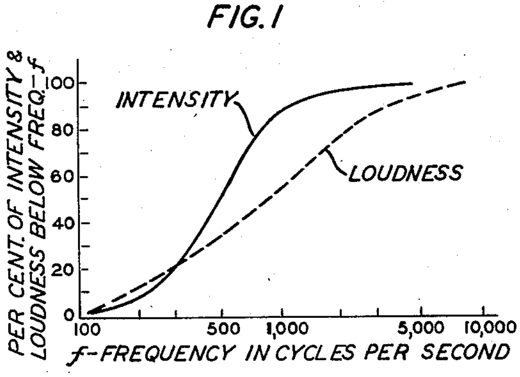
Fig. 1 is a graph showing the percent of intensity and percent of loudness below any sinusoidal component frequency in the spectrum of conversational speech.

From experimental data and computational methods well known to those skilled in the art, the relationship between the percent of sound intensity and percent of sound loudness below any sinusoidal component frequency in the complete frequency spectrum of human speech has been determined. A graphical plot of this relationship is depicted in Fig. 1. The loudness curve was developed from data obtained by tests on speech having a maximum R. M. S. intensity level of 78 decibels in 0.25-second intervals. This is an average level existing at a distance of 2.5 feet from the lips of a person speaking conversationally. For different intensity levels, the loudness curve will vary in a non-linear manner. Hence, for measurements of intensity to be made proportional to loudness for all levels of intensity, complicated non-linear circuits such as characterizing existing sound level meters which attempt to obtain a measure of loudness would have to be utilized. However, it has been found experimentally that the intensity level of speech in a normal telephone conversation is always within the range of 50 to 110 decibels. It is also found that for average intensity levels in this range speech loudness varies very nearly proportionally with intensity level. Accordingly, for purposes of testing telephone equipment the complicated non-linear relationship between intensity and loudness can be ignored, and loudness variation can be considered proportional to intensity level variation. This means that the curves in Fig. 1 can be considered accurately representative of speech sound within the range of intensity levels encountered in telephone transmission systems.

It is seen from Fig. 1 that the loudness spectrum greatly differs from the intensity spectrum. About 96 percent of sound intensity is in the frequency band from 100 to 1200 cycles per second, while only about 60 percent of total loudness is included in that band. If a telephone transmission device or circuit under test uniformly passed frequencies up to about 6000 cycles per second without distortion, measurements of total intensity would be proportional to total loudness because substantially all of each factor would be passed. Telephone equipment now in use only transmits frequencies from 300 to 3300 cycles per second, and is intentionally designed to emphasize frequencies over 1200 cycles per second in order to improve the intelligibility of transmitted speech. As a result, considerable deviation exists between intensity and loudness measurements. Experimentally obtained comparisons have shown this deviation to be as great as 10 decibels for some telephone circuits.

It is therefore apparent that for an artificial sound source to provide a loudness testing signal which will enable direct measurement of the speech loudness transmission characteristics of telephone apparatus with ordinary intensity responsive instruments the intensity contribution of each frequency component in the test signal must be so weighted that the total intensity below any frequency in the signal is the same as the total loudness below that frequency in speech sound, in both cases on a percentage basis. It should be noted from Fig. 1 that the speech frequency band from 300 to 3300 cycles per second includes about 75 percent of both total loudness and total intensity. Of the remaining 25 percent, only about 10 percent of the loudness is contributed by frequencies above 3300 cycles per second. In addition, as stated above, the transmission band of modern telephone circuits is 300 to 3300 cycles per second. Hence, not only would attempts at measurements beyond that frequency range have no utility in connection with the testing of telephone equipment, but they are actually unnecessary since an adequate proportion of total loudness and intensity of transmitted speech is within that range. The invention makes use of this fact by limiting the required loudness testing signal frequency band to the range of 300 to 3300 cycles per second.

The required loudness weighting can be calculated by dividing the speed sound loudness curve of Fig. 1 into ten frequency bands which contribute equal 10 percent increments to total loudness. The seven of these bands which lie between 300 and 3300 cycles per second, and the band immediately below 300 cycles per second, are listed in column 1 of the following Table 1.

TABLE 1

| Frequency Band in Cycles<br>(1) | Band Width in Cycles ($\Delta f$)<br>(2) | 10 Log $\Delta f$<br>(3) | Mid-Frequency in Cycles<br>(4) | 10 Log $\Delta f$—20.9<br>(5) |
|---|---|---|---|---|
| 170–280 | 110 | 20.41 | 225 | (0 at 300 cycles per second) |
| 280–410 | 130 | 21.14 | 345 | 0.24 |
| 410–580 | 170 | 22.30 | 495 | 1.40 |
| 580–800 | 220 | 23.42 | 690 | 2.52 |
| 800–1,100 | 300 | 24.77 | 950 | 3.87 |
| 1,100–1,520 | 420 | 26.23 | 1,310 | 5.33 |
| 1,520–2,140 | 620 | 27.92 | 1,830 | 7.02 |
| 2,140–3,300 | 1,160 | 30.65 | 2,720 | 9.75 |

For any intensity spectrum, the total intensity in any frequency band in the spectrum is the product of the band width and the average intensity per cycle within that band. If a sweep frequency source is provided having a flat intensity spectrum, meaning constant intensity per cycle at all frequencies in the range of interest, the total intensity in any frequency band will be proportional to the width of that band. Hence, for each band to contribute equal increments to the total loudness, the mid-frequency of each band must be attenuated by an amount proportional to the width of the band. The mid-frequency of each of the equal loudness bands in column 1 is listed in column 4. The band widths are listed in column 2. The required attenuation in decibels at the mid-frequency of each of those bands will be 10 times the logarithm to the base 10 of each band width, and is listed for each band in column 3. By interpolation of these values, the attenuation at 300 cycles per second turns out to be 20.9 decibels. The required attenuation can be calculated relative to that at 300 cycles per second by reducing all the attenuation values by 20.9 decibels. Doing that, the required attenuation at each mid-frequency starting at 300 and going up to 3300 cycles per second, relative to zero attenuation at 300 cycles per second, is tabulated in column 5 of Table 1. A graph of this attenuation vs. frequency characteristics is plotted in Fig. 2 as the curve denoted "Theoretical."

Figure 3:
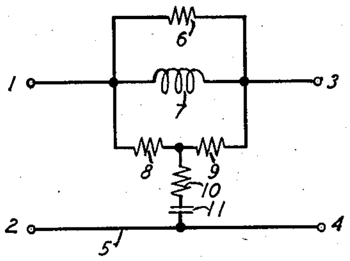
Fig. 3 is a diagram of the circuit of an equalizer which may be utilized to achieve loudness weighting.
Figure 2:
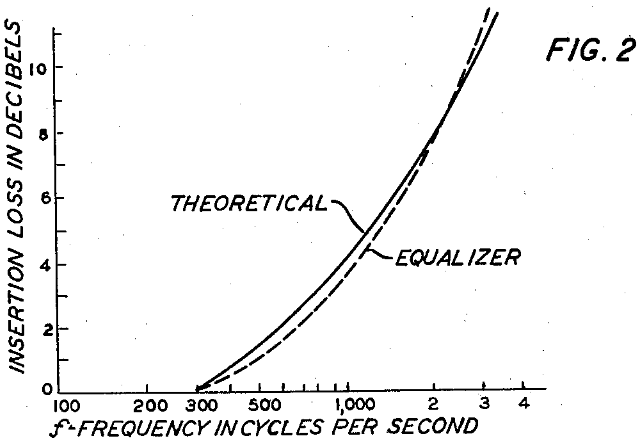
Fig. 2 is a graph showing the theoretical and an actually achieved attenuation of each frequency component in a flat intensity spectrum so that the percent of intensity below any frequency will be the same as the percent of loudness below the same frequency in the spectrum of speech signals transmitted by telephone systems.

The combination of a device having an attenuation vs. frequency characteristic substantially in accordance with the theoretical curve in Fig. 2 with a sweep frequency source having a flat intensity spectrum will be capable of producing the required loudness testing signal. A device having such an attenuation characteristic is referred to hereinafter in this specification and in the appended claims as an equalizer. A novel electrical equalizer has the circuit shown in Fig. 3. Referring to Fig. 3, the equalizer has input terminals 1 and 2 and output terminals 3 and 4. Terminals 2 and 4 are joined by a common conductor 5 which, when the equalizer is included in a complete circuit having a common ground connection, may simply be ground. Terminals 1 and 3 are joined through an inductive impedance comprising the parallel combination of an inductor 7, a resistor 6, and series connected resistors 8 and 9. This inductive impedance is connected to conductor 5 through a capacitive impedance comprising the series combination of resistor 10 and condenser 11 connected at one terminal to the junction of resistors 8 and 9 and at the other terminal to conductor 5. By proper choice of the values of each component in the equalizer circuit, an extremely close approximation to the theoretical curve shown in Fig. 2 may be achieved. Specific preferred values, which will result in an equalizer attenuation characteristic shown by the curve marked "Equalizer" in Fig. 2, are as follows:

| | | |
|---|---|---|
| Resistors Nos.: | | |
| **6** | ohms | 8350 |
| **8** | do | 500 |
| **9** | do | 500 |
| **10** | do | 30 |
| Inductor No. **7** | millihenries | 84.5 |
| Condenser No. **11** | microfarads | 0.34 |

In case the sweep frequency source does not itself have a flat frequency characteristic, it requires only straightforward engineering to devise a filter circuit such that the combined characteristic of the source and filter is flat. As far as the equalizer itself is concerned, the combination would represent a suitable source. A further possible arrangement is to include such a filter with the equalizer in a single composite circuit. Since such alternatives are obvious, and since they are all equivalent, for simplicity the remainder of this specification will refer to an equalizer and a flat sweep frequency source.

Figure 5:
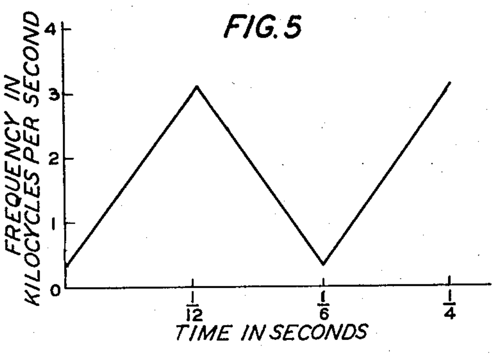
Fig. 5 is a graph showing the manner in which the frequency of the output of the warble oscillator varies with time.
Figure 4:
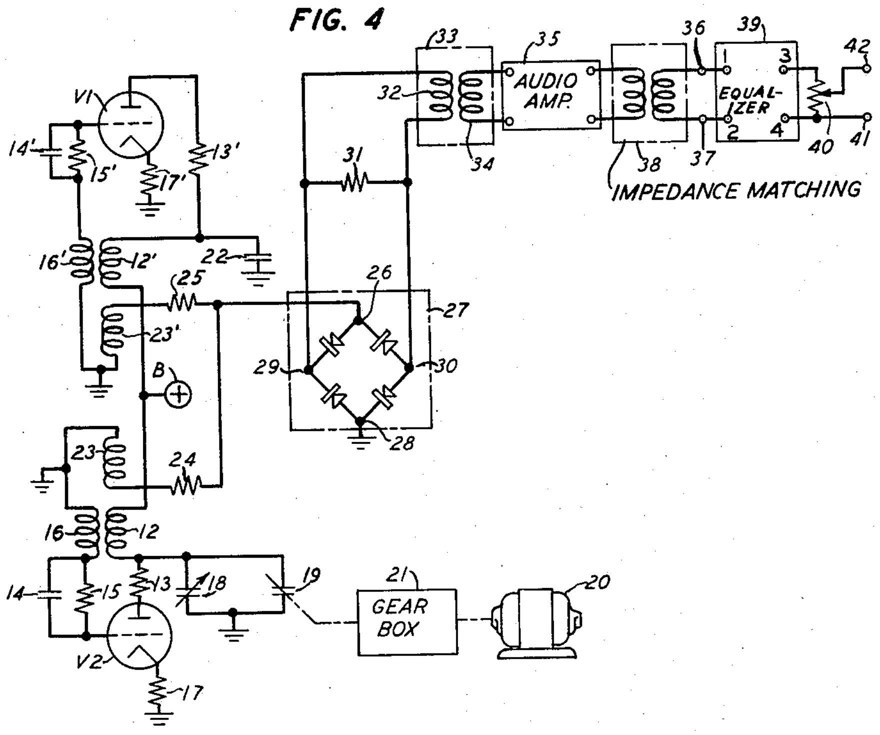
Fig. 4 is a diagram of the circuit of a warble oscillator which may be utilized in conjunction with the equalizer to provide the desired loudness testing signal.

In order to utilize the equalizer to produce a loudness testing signal, it is necessary to provide a sweep frequency signal source having a flat intensity vs. frequency spectrum. Such a source may provide an acoustic or electrical output, but preferably provide an electrical output. The source must provide a sweep frequency output having uniform intensity per cycle over the frequency range of 300 to 3300 cycles per second. It must also provide properly spaced frequency components, as described below. The circuit diagram of such a sweep frequency signal source is shown in Fig. 4. This complete circuit is a frequency modulated oscillator known in the art as a warble oscillator, and may be adapted to produce an electrical signal of constant amplitude and of a frequency which varies in the manner depicted by the graph in Fig. 5. As seen, the frequency linearily varies with time between 300 and 3300 cycles per second, repetitively, at a constant rate. A cyclic linear variation of this type is equivalent to a source of closely spaced discrete frequency components of uniform intensity extending over the entire sweep frequency band. The theoretical substantiation of this fact is given in the articles "Notes on the Theory of Modulation," J. R. Carson, Proceedings of the I. R. E., volume 10, pages 57–66, February 1922; and "Frequency Modulation," Balth Van der Pol, Proceedings of the I. R. E., volume 18, pages 1194–1205, July 1930. When the repetition rate is set for a period of 1/6 second per cycle, the discrete frequencies are spaced 6 cycles per second apart, and so occur successively at intervals of about 0.16 second. This is close to the experimentally measured average syllabic repetition rate of speech; a highly important speech characteristic which must be duplicated by any artificial sound source attempting to simulate the characteristics of speech. In addition, such duplication of average syllabic repetition rate is an important characteristic of a signal suitable for conditioning a telephone transmitter used for test purposes so that its performance will be the same as it would be in actual telephone service. A variety of types of warble oscillators are known to the art, but the circuit depicted in Fig. 4 is shown for definiteness of description.

Referring to Fig. 4, triode V1 and its associated circuits serve as a variable frequency oscillator which may be adjusted to oscillate at approximately 200 kilocycles per second. Triode V2 and its associated circuits serve as a relatively fixed frequency oscillator, the precise frequency of which is continuously and linearly varied between the frequency limits of 300 cycles per second and 3300 cycles per second below the frequency of triode V1. By applying the output of both oscillators to a conventional modulator, which may conveniently be a simple full-wave rectifier 27, and passing the output through an audio amplifier 35 which does not pass radio frequency signals, the desired sweep frequency band at uniform intensity is obtained. Triode V2 has its plate supplied with positive potential from direct-current source B+ via a series path comprising source B+, transformer winding 12, resistor 13, and the plate of triode V2. Resistor 13 serves as a direct-current plate load. The grid of triode V2 is connected to one terminal of a grid leak biasing circuit comprising the parallel connection of condenser 14 and resistor 15. Another transformer winding 16 is connected between the other terminal of that self-biasing circuit and ground. Windings 12 and 16 are inductively coupled. The cathode of triode V2 is connected to one terminal of a relatively small resistor 17, of the order of 1000 ohms, which is grounded at its other terminal. Resistor 17, in conjunction with the biasing circuit comprising condenser 14 and resistor 15, serves to maintain a constant amplitude of oscillation of triode V2.

Up to this point the description of the circuits connected to triode V2 also applies to those connected to triode V1, so that corresponding circuit components have been designated with the same numerals but with a prime mark. Thus, resistor 13' constitutes the plate load resistor for triode V1, just as resistor 13 does for triode V2. The same is true of all primed and unprimed circuit components having the same numerals in Fig. 4.

The difference between the operation of the variable frequency oscillator comprising triode V1 and the fixed frequency oscillator comprising triode V2 lies in the tuning condensers connected in the plate circuit of each of these tubes. In the circuit of triode V2, two condensers, 18 and 19, are connected in parallel between ground and the junction of resistor 13 and transformer winding 12. Condenser 19 is a well-known rotary type air condenser comprising parallel semi-circular plates. One plate is fixed while the other can be rotated by a shaft. The shaft is continuously rotated at uniform speed by a driving means, which may comprise synchronous motor 20 and gear speed reduction box 21, mechanically coupled to the shaft. The driving means is adapted to rotate the shaft at the rate of six complete rotations per second. The condenser 18 is manually adjustable to set the range of frequency variation of triode V2. The frequency of triode V2 is determined by the resonant frequency of the sum of the capacitances of condensers 18 and 19 in parallel with the inductance of transformer winding 12. As the capacitance of condenser 19 varies, the resonant frequency will, therefore, also vary. However, the maximum capacitance of condenser 19 may be only about 6 or 7 micro-microfarads and the capacitance of condenser 18 may be about 450 micro-microfarads. Consequently, the variation in frequency will be less than 1 percent of the frequency which exists when the capacitance of condenser 19 is a minimum. This extremely small percentage frequency variation results in a very closely linear relationship between frequency and the rotation of the shaft of condenser 19. Hence, the frequency will vary linearily with time, going through one cycle in 1/6 second. A further consquence of this small percentage frequency variation is very closely constant amplitude of oscillation, since all impedances and currents existing in the circuits associated with triode V2 will be very closely constant. In order for this small variation in frequency to result in a band 3000 cycles per second wide, which is the desired objective, the frequency of triode V2 must be in the vicinity of 200 kilocycles per second. This can be established by choosing transformer winding 12 so the resonant frequency of its inductance and the capacitance of condenser 18 is 200 kilocycles per second when the capacitance of condenser 18 is set at about 450 micro-microfarads. Accurate adjustment is then attained by setting the capacitance of condenser 18 so that the frequency is reduced by 3000 cycles per second when the shaft of condenser 19 is rotated from the position of minimum capacitance to that of maximum capacitance of condenser 19.

Having obtained the required sweep frequency band width, the oscillator comprising triode V1 is utilized to establish the actual frequency limits of this band. A variable condenser 22 is connected between ground and the junction of resistor 13′ and transformer winding 12′. The frequency of triode V1 is determined by the resonant frequency of the capacitance of condenser 22 and the inductance of transformer winding 12′. The latter is the same as transformer winding 12. Condenser 22 may be adjusted for such capacitance that triode V1 oscillates at a frequency 300 cycles per second above the highest frequency of triode V2, which obtains when the capacitance of condenser 19 is at its minimum. The amplitude of oscillation of triode V1 is constant, since once condenser 22 is adjusted the oscillatory frequency is fixed.

As a result of this circuit configuration, across transformer winding 12 there will exist a voltage of constant amplitude and of an instantaneous frequency equal to the frequency of oscillation of triode V2. Also, there will exist across transformer winding 12′ a voltage of constant amplitude and of a frequency equal to the frequency of oscillation of triode V1. Inductively coupled to transformer winding 12 is a transformer winding 23 connected between ground and one terminal of a resistor 24. Inductively coupled to transformer winding 12′ is a transformer winding 23′ connected between ground and one terminal of a resistor 25. The other terminal of resistor 24 and the other terminal of resistor 25 are both connected to input terminal 26 of modulator 27, of which the other input terminal 28 is grounded. Transformer windings 23 and 23′ serve, respectively, to couple the potentials across transformer windings 12 and 12′ to the modulator 27. One of the resistors 24 and 25 preferably has a resistance about ten times that of the other, these resistors and their relative magnitudes serving to reduce the amplitude of undesired frequency components which are produced in the output of the modulator. The output terminals of modulator 27 are at 29 and 30, and are connected, respectively, to the terminals of an output resistor 31. Among the modulation products produced across resistor 31 there will be one having a frequency varying between 300 and 3300 cycles per second and of constant amplitude, for the reasons explained above.

Primary winding 32 of audio coupling transformer 33 is connected across resistor 31. The secondary winding 34 of audio coupling transformer 33 is coupled to the input terminals of a conventional audio frequency amplifier designated in block 35. Since the only particular requirement placed on the audio amplifier designated in block 35 is that it have uniform amplification over a frequency range including the band of 300 to 3300 cycles per second, and since many varieties of amplifiers meeting this requirement are well known in the art and are commercially available, no further description of it is included. Since both transformer 33 and the audio amplifier in block 35 are designed to cover only the audio frequency range, they will eliminate, or at least reduce to an insignificant magnitude, all high frequency modulation products existing across primary winding 32. For all practical purposes the output of audio amplifier 35 will consist solely of the desired constant amplitude 300 to 3300-cycle per second sweep frequency signal. The output of audio amplifier 35 is preferably coupled to output terminals 36 and 37 by an impedance matching transformer 38 selected so as to provide a good impedance match between the output impedance of the amplifier and the circuit connected across terminals 36 and 37.

To utilize the sweep frequency source described above in conjunction with the invention, terminals 36 and 37 may be directly connected to input terminals 1 and 2 of an equalizer of the kind described above with reference to Fig. 3. In Fig. 4 the equalizer is simply designated as being comprised within box 39, having output terminals 3 and 4. Equalizer output terminals 3 and 4 may be bridged across a potentiometer 40 having output terminals 41 and 42. By adjusting the brush of potentiometer 40, any desired average level of the electrical loudness testing signal existing across terminals 41 and 42 can be attained. This signal is an electrical voltage having an intensity vs. frequency characteristic of substantially the same shape as the loudness vs. frequency characteristic of speech sound within the intensity and frequency range transmitted by telephone systems. It includes frequency components spaced about 6 cycles per second apart over that frequency range. When applied to an intensity responsive volume meter the meter will directly indicate a quantity proportional to the loudness volume of the signal, which is a measure of how loud it would sound to an average listener if it were converted to an acoustic signal having the same intensity vs. frequency characteristic.

The circuitry described above generates the loudness testing signal in the form of an electrical voltage. However, since electroacoustic converters such as microphones and loudspeakers well known to the art will produce an acoustic signal having the same shape pressure vs. frequency spectrum as the voltage vs. frequency spectrum of an applied electrical signal voltage, the electrical loudness testing signal may be readily converted to an acoustic loudness testing signal suitable for application to a telephone receiver. Such conversion must be effected in order to achieve complete duplication of actual telephone service conditions, wherein a telephone transmitter is utilized to impress the speech on the telephone system. For best results the distribution of the resultant sound field about the converter should approximate that existing about the mouth of a person speaking conversationally. The latter function is performed by devices known in the art as artificial mouths. A compilation of various types of artificial mouths is given on pages 395 through 404 of the text "Acoustical Measurements," Leo L. Berenek, John Wiley and Sons, Incorporated, 1949.

A preferred artificial mouth for use in practicing the invention is essentially the one designated type I in the text cited. It is more fully described in the article "A Voice and Ear for Telephone Measurement," A. H. Inglis, C. H. G. Gray and R. T. Jenkins, Bell System Technical Journal, volume 11, 1932, pages 293 through 317. As explained therein, the mouth is a simple adaptation of a commercially available horn-type moving coil loudspeaker. The required adaptation comprises removing the horn, modifying the throat to accommodate a ring shaped support, and mounting an acoustical resistance material on the ring support. The sound is radiated from the acoustic resistance, through an area approximating that of the open human mouth (1¼ inches diameter). A spacing ring is mounted above the acoustic resistance to serve as a fixed reference plane for measuring distances from the artificial mouth. The cited Bell System Technical Journal article gives the pertinent characteristics of the acoustic resistance material. Patent 1,707,545, "Acoustic Device," issued April 2, 1929, to E. C. Wente, discloses a loudspeaker which, except for some constructional improvements, typifies those now in commercial use. The required modification of such a loudspeaker to construct an artificial mouth of the type described is shown in Fig. 6.

Figure 6:
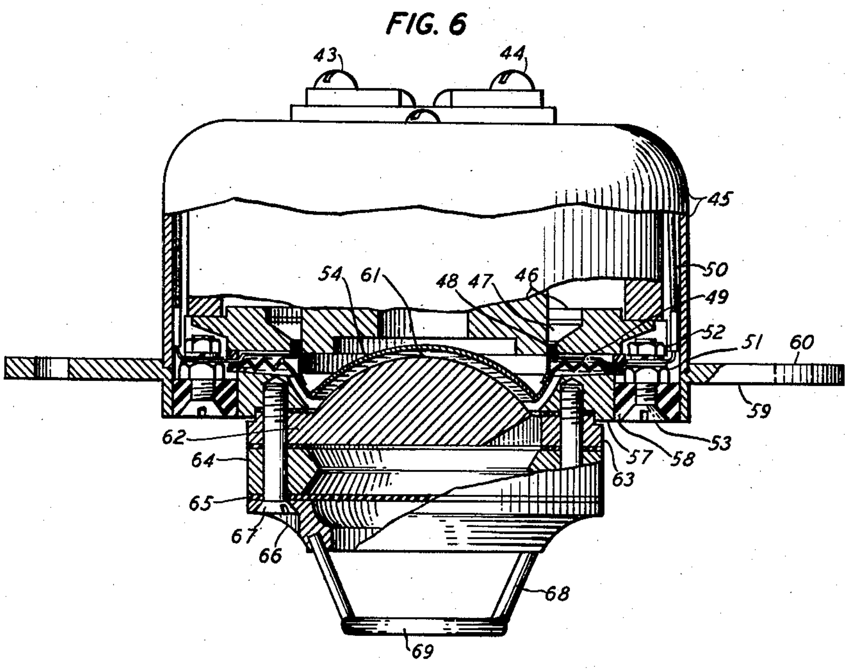
Fig. 6 is a partly cut-away drawing of an artificial mouth adapted for converting an electrical signal to an acoustic signal and for applying it to a telephone transmitter.

Referring to Fig. 6, at 43 and 44 are screw-type terminals to which the output terminals of the source of the loudness testing signal may be connected. These terminals extend through a cover 45 which protects the inner parts of the artificial mouth. Only the lower portion of the field magnet 46 is shown, the construction of the magnet being well known and closely similar to that in the above-cited Patent 1,707,545. The field magnet may be permanently magnetized or may be magnetized by direct current circulated through a field winding. In the air gap 47 between the poles of field magnet 46 is disposed a voice coil 48 free to move transversely to the magnetic flux. The terminals of the voice coil 48 are connected by electrical conductors 49 to output terminal conductors 50 each of which is connected to one of the output terminals 43 and 44. Conductors 49 and 50 are pressed into contact between nuts 51 and 52 threaded tightly together on screws 53. Voice coil 48 is mechanically joined to a vibratory diaphragm 54, so that the motion of the voice coil causes corresponding vibration of the diaphragm. Consequently, an electrical signal voltage applied to the voice coil will be converted to an equivalent acoustic signal having the same shape intensity level vs. frequency spectrum. Diaphragm 54 has a hemispherical portion and a corrugated portion, the outer edge of the latter portion being tightly secured between washers pressed between throat ring 57 and the face of field magnet 46. Throat ring 57 has a number of peripheral holes bored through it, in which has been pressed electrical insulating material 58. Screws 53 are threaded through insulating material 58 and are held fixed with respect thereto by the nuts 51. Throat ring 57 also has a flanged portion 59 bearing a number of spaced peripheral mounting holes 60. Throat ring 57 is secured in position by spaced screws (not shown) extending through it, through the corrugated portion of diaphragm 54, and threaded into the face of field magnet 46. A hemispherically topped plug 61 having three narrow supporting flanges 62 joined to plug supporting ring 63 is mounted opposite the hemispherical portion of diaphragm 54. As explained in cited Patent 1,707,545, plug 61 improves the uniformity of the frequency response of the artificial mouth. A mounting ring 64 is mounted on plug supporting ring 63, and an acoustic resistance material 65 is placed as a cover over the mounting ring. Material 65 has the characteristics described in the above-cited article in the Bell System Technical Journal. Material 65 is supported between fastening ring 66 and mounting ring 64. The assembly of fastening ring 66, acoustic resistance material 65, mounting ring 64 and plug supporting ring 63 is all secured by bolts 67 threaded through matching holes in all of those members and into threaded holes in throat ring 57. Fastening ring 66 also serves as a support for wire legs 68 extending outward from ring 66 and supporting spacing wire ring 69. Spacing wire ring 69 is approximately 1¼ inches outer diameter, and is supported about ½ inch from the surface of fastening ring 66, which is about ⅜ inch thick. These dimensions have been found to result in a variation of sound pressure with distance from the plane of ring 69 closely resembling the variation of sound pressure with distance from the lips of a person speaking conversationally.

When utilizing the artificial mouth it must be recognized that the pressure vs. frequency response of a loudspeaker is not flat. This is true of nearly all electroacoustic converters, the pressure of the acoustic output rising with increasing frequency of electrical input. To achieve a flat pressure response characteristic compensating networks are employed. These networks are designed with cascaded resonant sections which, acting together, have an attenuation vs. frequency response close to the inverse of the loudspeaker pressure response characteristic. The method of designing such networks from a known loudspeaker pressure response characteristic is well known to those skilled in the art. For the artificial mouth described above with reference to Fig. 6, a compensating network having the circuit shown in Fig. 7 achieves the desired resultant flat pressure response over a range of about 70 to 4200 cycles per second, the added frequency range being useful for more general application of the artificial mouth.

Figure 7:
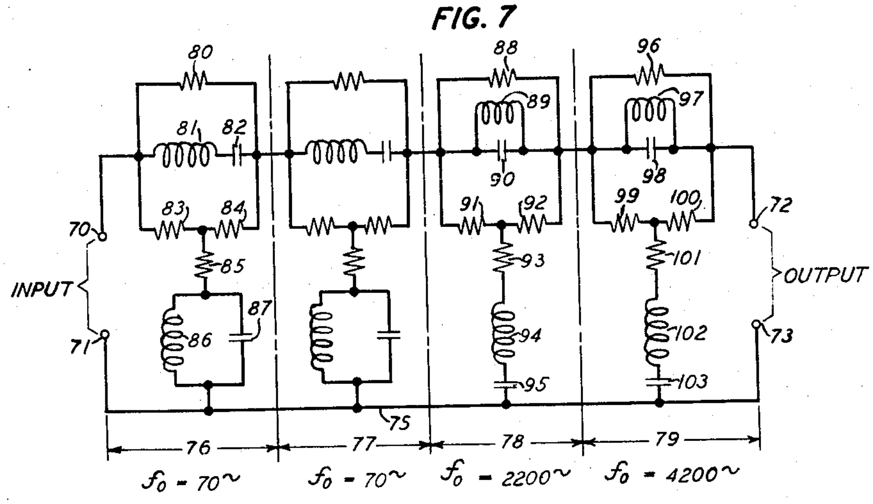
Fig. 7 is a diagram of a compensating network which may be utilized in conjunction with the artificial mouth in order to achieve a constant pressure vs. frequency characteristic of the acoustic output of the artificial mouth for a constant intensity electrical input signal.

Referring to Fig. 7, the input terminals of the compensating networks are at 70 and 71 and the output terminals are at 72 and 73. Terminals 71 and 73 are joined by the common conductor 75 which, when the compensating network is used in a measuring device, would simply be a connection to ground. Connected in cascade between the input and output terminals are four filter sections 76, 77, 78 and 79. Filter sections 76 and 77 each have a resonant frequency of 70 cycles, and introduce rapidly increasing attenuation at higher frequencies. Two identical sections are used to attain the needed high attenuation above 70 cycles. Filter section 78 has a resonant frequency of 2200 cycles, at which it introduces maximum attenuation, and filter section 79 has a resonant frequency of 4200 cycles, at which it introduces maximum attenuation. The composite attenuation vs. frequency characteristic of the four cascaded sections is such that when added to the pressure vs. frequency characteristic of the artificial mouth a flat frequency characteristic will result.

Filter section 76 comprises a resistor 80 shunted by the series connection of an inductor 81 and a condenser 82. Resistor 80 is further shunted by the series connection of resistors 83 and 84. The junction of resistors 83 and 84 is connected to one terminal of a resistor 85, the other terminal of which is connected to the parallel combination of inductor 86 and condenser 87. The free terminal of the latter parallel combination is connected to conductor 75. Filter section 77 is identical with filter section 76, all corresponding circuit components having the same values. Filter section 78 comprises a resistor 88 shunted by the parallel combination of an inductor 89 and a condenser 90. Resistor 88 is further shunted by the series connection of resistors 91 and 92. The junction point of the latter resistors is connected to the terminal of the series combination of a resistor 93, an inductor 94 and a condenser 95. The free terminal of this series combination is connected to conductor 75. Filter section 79 comprises a resistor 96 shunted by the parallel combination of an inductor 97 and a condenser 98. Resistor 96 is further shunted by the series connection of resistors 99 and 100. The junction point of the latter resistors is connected to the terminal of the series connection of a resistor 101, an inductor 102 and a condenser 103. The free terminal of this series combination is connected to conductor 75.

While a variety of values of the circuit components utilized in the compensating network shown in Fig. 7 would provide the desired attenuation characteristic, the following tabulated circuit component values have been found satisfactory:

*Resistors*

| No.: | Ohms |
|---|---|
| 80 | 2730 |
| 83 | 600 |
| 84 | 600 |
| 85 | 132 |
| 88 | 1150 |
| 91 | 600 |
| 92 | 600 |
| 93 | 312 |
| 96 | 2730 |
| 99 | 600 |
| 100 | 600 |
| 101 | 132 |

*Inductors*

| No.: | Millihenries |
|---|---|
| 81 | 1.365 |
| 86 | 1.365 |
| 89 | 0.036 |
| 94 | 0.052 |
| 97 | 0.0265 |
| 102 | 0.0095 |

*Condensers*

| No.: | Microfarads |
|---|---|
| 82 | 3.81 |
| 87 | 3.81 |
| 90 | 0.144 |
| 95 | 0.100 |
| 98 | 0.055 |
| 103 | 0.0705 |

Since the compensating network introduces a great amount of attenuation, it is necessary to raise the output intensity to a level adequate for actuating the artificial mouth. To do that, between the compensating network and the artificial mouth there is connected an audio amplifier. This audio amplifier may be any one of the well-known commercially available types, with a flat frequency response over a range comprising 300 to 3300 cycles per second. Accordingly, a complete electroacoustic converter for converting the electrical loudness testing signal to an acoustic loudness testing signal comprises, from input to output, the compensating network to which the electrical signal is applied, an audio amplifier connected to the compensating network, and the artificial mouth having its voice coil connected to the output of the audio amplifier.

The output of the artificial mouth is applied to a telephone transmitter. The acoustic coupling of the two must simulate that existing between the mouth of the average human caller and the transmitter of a handset in actual telephone service. On the basis of experiment, this requires that the distance between the center of the spacing ring 69 and the center of the transmitter grid be 3 centimeters for telephone handsets of the kind in most common use today. This handset is Western Electric type 302. A newer type handset now coming into increasing use is the Western Electric type 500, and the corresponding distance for this handset has been found to be 2 centimeters. These distances are known as the modal distance between the transmitter and the source of speech sound. In addition, the angle between the plane of the spacing ring 69 and the plane of the transmitter grid should be about 20 degrees. A final requirement is that the axis of the spacing ring and the axis of the transmitter grid should lie in a common plane. These spacings and angular relationship are experimentally determined average values for a large sampling of telephone users. To establish these dimensional relations, and also to permit free 300-degree rotation of the telephone transmitter for reasons stated below, a mechanical support generally of the type illustrated in Fig. 8 may be conveniently utilized.

Figure 8:
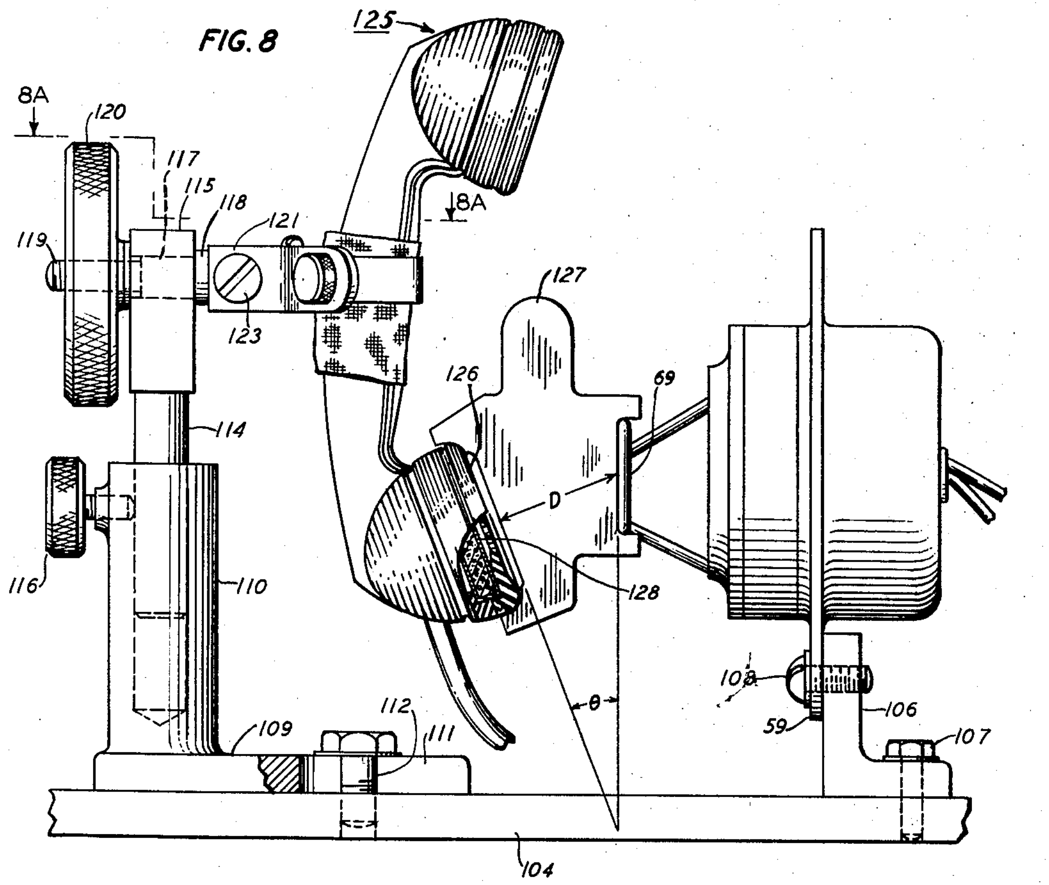
Fig. 8 is a side view of a suitable mechanical support for mounting the artificial mouth and the transmitter of a telephone handset in proper spatial relationship in accordance with the invention.
Figure 8A:
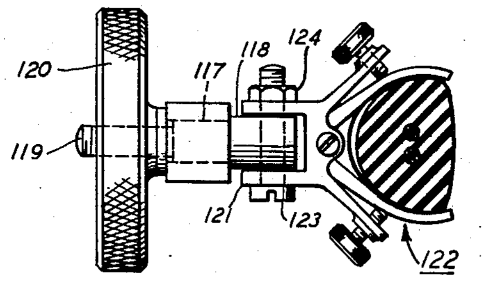
Fig. 8A is a drawing in section taken along axis 8A in Fig. 8.

Referring to Fig. 8, the equipment is mounted on a baseplate 104. Baseplate 104 should be substantially horizontal. A right angle bracket 106 is secured to baseplate 104 by a screw 107 extending through the bracket and threaded into the baseplate. One of the mounting holes 60 is flanged portion 59 of throat ring 57 of the artificial mouth (see Fig. 6) is aligned with a threaded horizontal hole in the vertical portion of bracket 106, and a screw 108 passing through mounting hole 60 and threaded into bracket 106 secures the artificial mouth in position. The plane of spacing ring 69 will therefore be disposed vertically. Also mounted on baseplate 104 is a mounting block 109 from which there perpendicularly projects a lug 110 having a hole drilled through its center terminating a short distance above mounting block 109. Cut into mounting block 109 is a slot 111 through which extends a locking screw 112 threaded into baseplate 104. By loosening locking screw 112, mounting block 109 may be slid to any desired distance from the artificial mouth and may be locked there by tightening screw 112. Mounting block 109 is so located on baseplate 104 that the horizontal axis of spacing ring 69 passes through the vertical centerline of lug 110 and also is parallel to the longitudinal axis of slot 111. Extending into the vertical hole in lug 110 is a shaft 114 bearing on its end portion a collar 115. Shaft 114 may slide vertically within the vertical hole in lug 110, thereby permitting adjustment of the height of collar 115, and may be fixed in position by tightening a set screw 116 threaded horizontally through a hole in the side of lug 110 and pressed against shaft 114. Extending through a horizontal hole in collar 115 and axially rotatable therein is a rod 117 bearing at one end a shoulder portion 118 of larger diameter than the hole in collar 115. Rod 117 bears at its other end a threaded portion 119 of smaller diameter, and which projects some distance outward from collar 115. Threaded on threaded portion 119 is a knurled nut 120. Accordingly, by tightening knurled nut 120 the shoulder portion 118 of rod 117 is pressed tightly against the face of collar 115 so that rod 117 is fixed in position. Loosening nut 120 permits axial rotation of rod 117. Mounted transversely on shoulder 118 is the yoke portion 121 of a clamp 122. The general configuration of the clamp and its mounting may be more readily seen by reference to Fig. 8A, which is a sectional view taken along axis 8A of Fig. 8. A screw 123 passing through matching holes in yoke portion 121 and shoulder 118 and secured by nut 124 fixes clamp 122 in position relative to shoulder 118. Loosening nut 124 permits rotation of clamp 122 about screw 123 as an axis. The arm of a telephone handset 125 is secured within clamp 122. A cloth or felt may be wrapped about the arm of handset 125 prior to tightening it within clamp 122 to protect it from damage by the clamp.

It is evident that freedom of motion of the handset in all possible directions is provided by the mechanical support just described. Consequently, it is a simple matter to adust the spacing between the guard ring 69 of the artificial mouth and the transmitter grid 126 so that the relative spacings and angular relationship specified above are obtained. To facilitate rapid adjustment, a flat spacing template 127 may have an edge which presses against spacing ring 69 and another edge which closely engages the transmitter grid 126. The angle between these edges will be 20 degrees, and the distance D is set so the distance between the axial center of guard ring 69 and the axial center of transmitter grid 126 is the modal distance for the type of handset utilized in the testing arrangement. Template 127 is, of course, removed after the required dimensional relationships have been established prior to actually making a test measurement. Rotation of the telephone transmitter in a vertical plane is simply accomplished by loosening knurled nut 120 and rotating the complete handset and rod 117 axially. The reason for such rotation will now be explained.

Telephone transmitters contain carbon granules 128, as indicated in Fig. 8 by a partial cut-away section of the transmitter. These granules are located just below the grid 126. When a transmitter is in normal service, repetitive handling and the variable pressure produced by speech sound produces a certain degree of granule tightness called packing. When a transmitter is utilized in a laboratory testing arrangement, the lack of normal usage causes greater packing than normal. This effect has been found to be the source of considerable variation in the performance characteristics of the transmitter. In the attempt to compensate for it, various conditioning methods have been proposed. None of these, however, have been found to result in close duplication of the performance characteristics which a given telephone transmitter has when in actual telephone service. By utilizing the loudness testing signal, a novel conditioning procedure was conceived and included in the measuring process whereby such duplication of transmitter service performance is attained. In this specification and in the appended claims the term "conditioned telephone transmitter" means a telephone transmitter which has been subjected to the novel conditioning procedure immediately prior either to utilizing it for testing its response or for making a loudness test measurement of other telephone equipment.

The novel conditioning procedure comprises the steps of:

(1) Mounting the transmitter at the modal distance from the artificial mouth with the plane of the transmitter grid 20 degrees from the vertical and with the transmitter grid facing upwardly.

(2) Rotating the transmitter from the position established in step 1 three times through an arc of 300 degrees in a vertical plane through the center of the transmitter grid.

(3) Applying the electrical loudness testing signal to the artificial mouth for approximately four seconds and at a level such that the artificial mouth applies the acoustic loudness testing signal to the telephone transmitter at a sound intensity level at the transmitter grid 6 decibels above the intensity level which will exist at the transmitter grid when the transmitter is used for making a loudness test measurement.

(4) Reducing the level of the electrical loudness testing signal applied to the artificial mouth so the sound intensity level at the transmitter grid will be the same as it is when the transmitter is used for making a test measurement.

Figure 9:
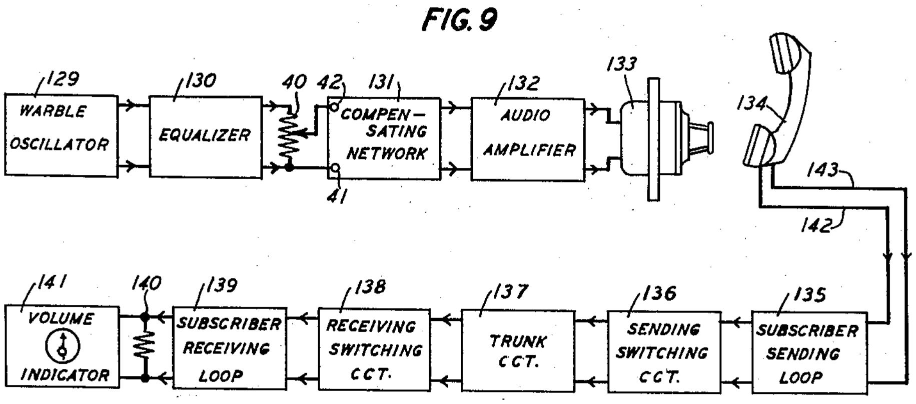
Fig. 9 is a block diagram of a complete testing system in accordance with the invention for testing the loudness transmission characteristic of a simulated complete telephone circuit.

A complete testing arrangement in accordance with the invention is shown in block form in Fig. 9. In block 129 is designated the warble oscillator of Fig. 4. The output of the warble oscillator is applied to the equalizer of Fig. 3 designated in block 130. The equalizer output, as described above, appears across potentiometer 40 and a desired portion of it is tapped off by adjusting the potentiometer brush. The potentiometer terminals 41 and 42 are connected to the input terminals of the compensating network of Fig. 7 designated in block 131. The output of the compensating network is applied to the audio amplifier designated in block 132. The audio amplifier output is applied to the terminals of artificial mouth 133, and the resultant acoustic loudness testing signal is acoustically applied to transmitter 134 of a telephone handset. The artificial mouth and the transmitter must be in proper spacial relationship and the transmitter must be conditioned, as described in detail above. In addition, the average sound intensity level at the transmitter grid should duplicate the average intensity level produced by the average caller speaking conversationally into a telephone. The average intensity level at the transmitter grid of a Western Electric type 302 telephone handset, as determined by taking the average of the intensity levels produced by a large sampling of callers, is 90.6 decibels. For the Western Electric type 500 handset, this intensity level is 93 decibels. Potentiometer 40 should be adjusted, therefore, so that the average sound intensity level at the grid of the transmitter used in the testing system is at the proper level for the type of handset under test.

In the event it is simply desired to measure the loudness transmission characteristic of the telephone transmitter alone, this may be easily accomplished by connecting the handset leads 142 and 143 to a suitable direct-current source having an output terminating impedance simulating the impedance of the loop circuit to which the telephone is connected when in actual service. A value proportional to the loudness volume of the output across such a terminating impedance may be simply measured with any convenient intensity responsive volume indicator. A convenient type of such an instrument is the standard VU meter well known in the art and commercially available from a number of different manufacturers. A complete description of it is given in the article "New Standard Volume Indicator and Reference Level," Electronics, volume 12, page 28, February 1939. The meter reads the average of the R. M. S. values of the signal applied to it in decibels relative to a reference level of 1 *milliwatt* of 1000-cycles per second power in a 600-ohm impedance, in approximately 0.25-second intervals. The scale readings are simply stated in terms of VU units.

This testing technique may be easily adapted to test the effect of variations in the impedance or other characteristics of any component or device utilized in a complete telephone transmission system. For example, in Fig. 9 the handset leads 142 and 143 are shown connected to a conventional telephone circuit represented by blocks 135, 136, 137, 138 and 139. Impedance 140 is equal to that of a telephone receiver. The apparatus in one or more of these blocks may comprise artificial networks having the same electrical characteristics as the actual apparatus. If the effect on transmission due to variations in the components of the subscriber's loop 139 is to be studied, an actual receiving loop may be used here while all other components may be artificial structures. The construction of these networks is well known and requires no further description. By connecting the VU meter designated in block 141 to measure the voltage existing across impedance 140, the meter reading will be proportional to the loudness volume of the transmitted signal. If it is desired to measure loudness transmission loss up to any intermediate stage in the complete telephone circuit, the VU meter need only be connected across the output terminals of that stage. The loss produced by any stage will be proportional to the difference between readings of the meter at the input and output terminals of that stage. When it is desired to measure the loudness transmission characteristic of a telephone receiver comprised in another handset, the leads 142 and 143 may be connected to the corresponding leads of the other handset, and the receiver output may be measured either acoustically with a sound level meter or electrically by converting the acoustic output of the receiver to an equivalent electrical signal by means of a standard electroacoustic converter and using a VU meter to measure the volume of the electrical output. In either case the meter will read a quantity proportional to transmitted loudness.

The novel apparatus and method described herein have been used for testing the effect of subscriber loop length on loudness transmission. For comparison, the tests were repeated using the calling and listening type test. The results by both tests agreed within 1 decibel maximum deviation. This is in contrast with errors as great as 10 decibels resulting when the novel loudness testing system and telephone transmitter conditioning process of this invention were not utilized.

Having completely described the invention and the manner and process of constructing and utilizing it, the following is the subject-matter which is claimed.

What is claimed is:

1. A system for measuring the speech sound loudness transmission characteristics of apparatus, comprising a source of an electrical loudness testing signal covering a frequency range comprising 300 to 3300 cycles per second, an electro-acoustic converter coupled to said source to convert said electrical loudness testing signal to an acoustic loudness testing signal having an intensity level versus frequency curve of the same shape as the voltage versus frequency curve of said electrical loudness testing signal, a conditioned telephone transmitter, and means for disposing said conditioned telephone transmitter in the same spatial relationship with said electroacoustic converter as the average spatial relationship that exists between a telephone transmitter in actual service and the mouth of a caller.

2. A system for testing the speed sound loudness transmission characteristics of telephone apparatus, comprising a warble oscillator producing a sweep frequency signal of constant intensity and repetitively covering the frequency range of 300 to 3300 cycles per second, an equalizer electrically coupled to said warble oscillator, said equalizer operative to convert said sweep frequency signal to a loudness testing signal, a conditioned telephone transmitter, means electrically coupling said equalizer to said conditioned telephone transmitter, means acoustically coupling said conditioned telephone transmitter to said telephone apparatus, and an intensity responsive measuring instrument connected to said telephone apparatus.

3. The invention in accordance with claim 2, characterized further in that said warble oscillator repetitively sweeps the frequency range of 300 to 3300 cycles per second and back again to 300 cycles per second at a cyclic rate approximating the average syllabic repetition rate of human speech.

4. The invention in accordance with claim 2, characterized further in that said equalizer comprises a pair of input terminals and a pair of output terminals, an inductive impedance connecting one of said input terminals with one of said output terminals, a common conductor connecting the other of said input terminals with the other of said output terminals, and a capacitive impedance connecting said inductive impedance with said common conductor.

5. In combination, a source of an electrical sweep frequency signal repetitively covering a frequency range comprising 300 to 3300 cycles per second at uniform intensity and at a uniform rate, an equalizer connected to said source, said equalizer operative to convert said sweep frequency signal to an electrical loudness testing signal having a frequency spectrum wherein the percent of total intensity below any frequency is the same as the percent of total loudness below the same frequency in the frequency spectrum of speech sound in the frequency band of from substantially 300 to 3300 cycles per second, an artificial mouth electrically coupled to said equalizer, and a conditioned telephone transmitter acoustically coupled to said artificial mouth in a manner simulating the average coupling between a telephone transmitter in actual telephone service and the mouth of a human caller.

6. The invention in accordance with claim 5, characterized further in that said artificial mouth has a spacing member for establishing a reference plane for measuring distance from said mouth, said reference plane being substantially vertically disposed, said telephone transmitter having a grid with a substantially plane surface, and said grid disposed at the modal distance from said reference plane with its plane surface at an angle of approximately 20 degrees from said reference plane.

7. A method of determining the loudness transmission characteristics of telephone apparatus connected to a telephone transmitter, comprising generating a sweep frequency signal having closely spaced discrete frequency components of equal intensity and extending over the range of 300 to 3300 cycles per second, attenuating each of said frequency components to produce an acoustic loudness testing signal wherein the percent of total intensity below any component frequency is substantially the same as the percent of total loudness below that frequency in the spectrum of speech sound in the frequency band of from substantially 300 to 3300 cycles per second, utilizing said acoustic loudness testing signal for conditioning said telephone transmitter, applying said acoustic loudness testing signal to said telephone transmitter in a manner simulating the application of speech sound to a telephone transmitter in actual telephone service by the average human caller, and measuring the volume of the output of said telephone apparatus.

8. A method of determining the loudness transmission characteristics of telephone apparatus connected to a telephone transmitter, comprising generating a sweep frequency electrical signal repetitively covering the frequency range of 300 to 3300 cycles per second at constant intensity and at a constant rate, attenuating each frequency component in said electrical signal to produce an electrical loudness testing signal wherein the percent of total intensity below any frequency component is the same as the percent of total loudness below the same frequency component in speech sound in said frequency range, converting said electrical loudness testing signal to an acoustic loudness testing signal having the same shape frequency spectrum, utilizing said acoustic loudness testing signal to condition said telephone transmitter, applying said acoustic loudness testing signal to said telephone transmitter in a manner simulating the application of speech sound to a telephone transmitter in actual telephone service by the average human caller, and measuring the volume of the output of said telephone apparatus.

References Cited in the file of this patent

UNITED STATES PATENTS 2,394,613 Houlgate et al. ---------- Feb. 12, 1946